United States Patent
Caubet et al.

(10) Patent No.: US 9,194,332 B2
(45) Date of Patent: Nov. 24, 2015

(54) IN-FLIGHT ATTITUDE CONTROL AND DIRECT THRUST FLIGHT CONTROL SYSTEM OF A VEHICLE AND CRAFT COMPRISING SUCH A SYSTEM

(75) Inventors: Pascal Caubet, St. Medard En Jalles (FR); Aurore Ferrant, St. Aubin de Medoc (FR)

(73) Assignee: HERAKLES, Le Haillan (FR)

(*) Notice: Subject to any disclaimer, the term of this patent is extended or adjusted under 35 U.S.C. 154(b) by 106 days.

(21) Appl. No.: 14/118,600

(22) PCT Filed: May 16, 2012

(86) PCT No.: PCT/FR2012/051103
§ 371 (c)(1),
(2), (4) Date: Dec. 27, 2013

(87) PCT Pub. No.: WO2012/156642
PCT Pub. Date: Nov. 22, 2012

(65) Prior Publication Data
US 2014/0109552 A1      Apr. 24, 2014

(30) Foreign Application Priority Data
May 19, 2011   (FR) ...................................... 11 01524

(51) Int. Cl.
*F02K 9/08*   (2006.01)
*B64G 1/26*   (2006.01)
*F42B 10/66*  (2006.01)
*B64G 1/40*   (2006.01)

(52) U.S. Cl.
CPC ... *F02K 9/08* (2013.01); *B64G 1/26* (2013.01); *B64G 1/401* (2013.01); *F42B 10/663* (2013.01)

(58) Field of Classification Search
CPC ............... B64G 1/26; F02K 9/08; F02K 9/30; F02K 9/42; F02K 9/80; F02K 9/88; F42B 10/30; F42B 10/66; F42B 10/661; F42B 10/663

USPC ............... 60/253, 200.1, 263; 244/3.21, 3.22, 244/164, 169
See application file for complete search history.

(56) References Cited

U.S. PATENT DOCUMENTS

| 4,856,734 | A  | * | 8/1989  | Davies   | 244/3.22 |
| 6,460,801 | B1 | * | 10/2002 | Mayersak | 244/3.22 |
| 7,102,113 | B2 | * | 9/2006  | Fujita et al. | 244/3.21 |

(Continued)

FOREIGN PATENT DOCUMENTS

GB            2251834 A        7/1992

OTHER PUBLICATIONS

International Search Report for corresponding PCT Application No. PCT/FR2012/051103, mailed Jul. 27, 2012.

*Primary Examiner* — J. Gregory Pickett
(74) *Attorney, Agent, or Firm* — Workman Nydegger

(57) ABSTRACT

A system for in-flight attitude control and side-force steering includes a thruster body and a plurality of valves capable of generating side thrusts put into communication with the thruster body. The valves are arranged in two sets of valves spaced apart from each other towards the front and towards the rear of the thruster body in substantially symmetrical manner relative to the center of gravity of the vehicle situated on a longitudinal axis (A) of the vehicle. Each set comprises a first pair of valves generating thrust in opposite directions along axes that are not in alignment and are parallel to a first axis, and a second pair of valves generating thrust in opposite directions along axes that are not aligned and are parallel to a second axis. The first and second axes are distinct and perpendicular to the longitudinal axis of the vehicle.

9 Claims, 6 Drawing Sheets

(56) References Cited

U.S. PATENT DOCUMENTS

| | | |
|---|---|---|
| 7,281,367 B2 * | 10/2007 | Rohrbaugh et al. ............ 60/253 |
| 8,800,913 B2 * | 8/2014 | Pagliara et al. ................ 244/52 |
| 2004/0245371 A1 | 12/2004 | Fujita et al. |
| 2011/0029160 A1 | 2/2011 | Pagliara et al. |

* cited by examiner

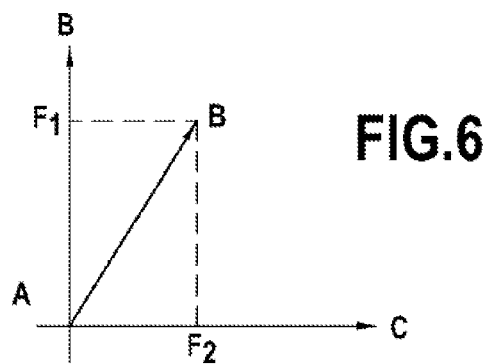
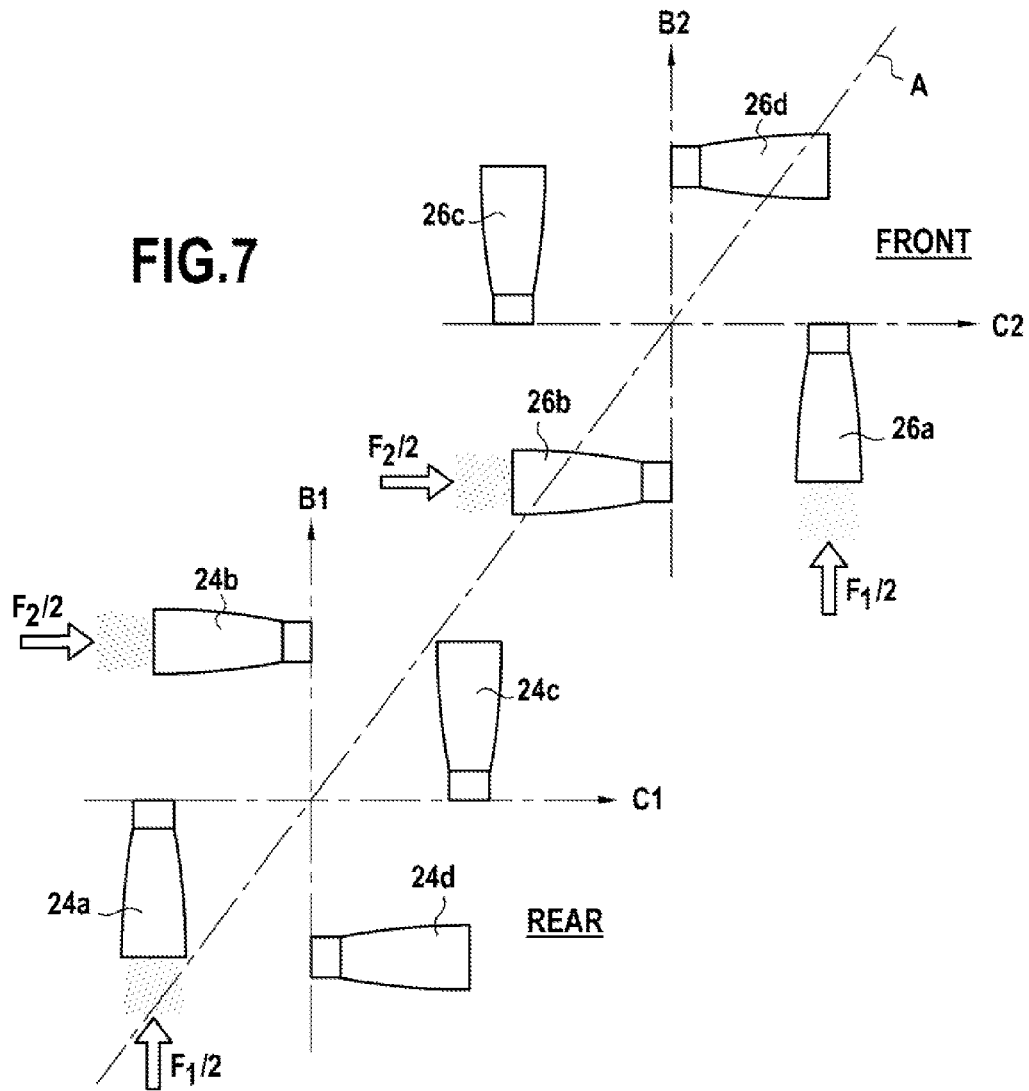

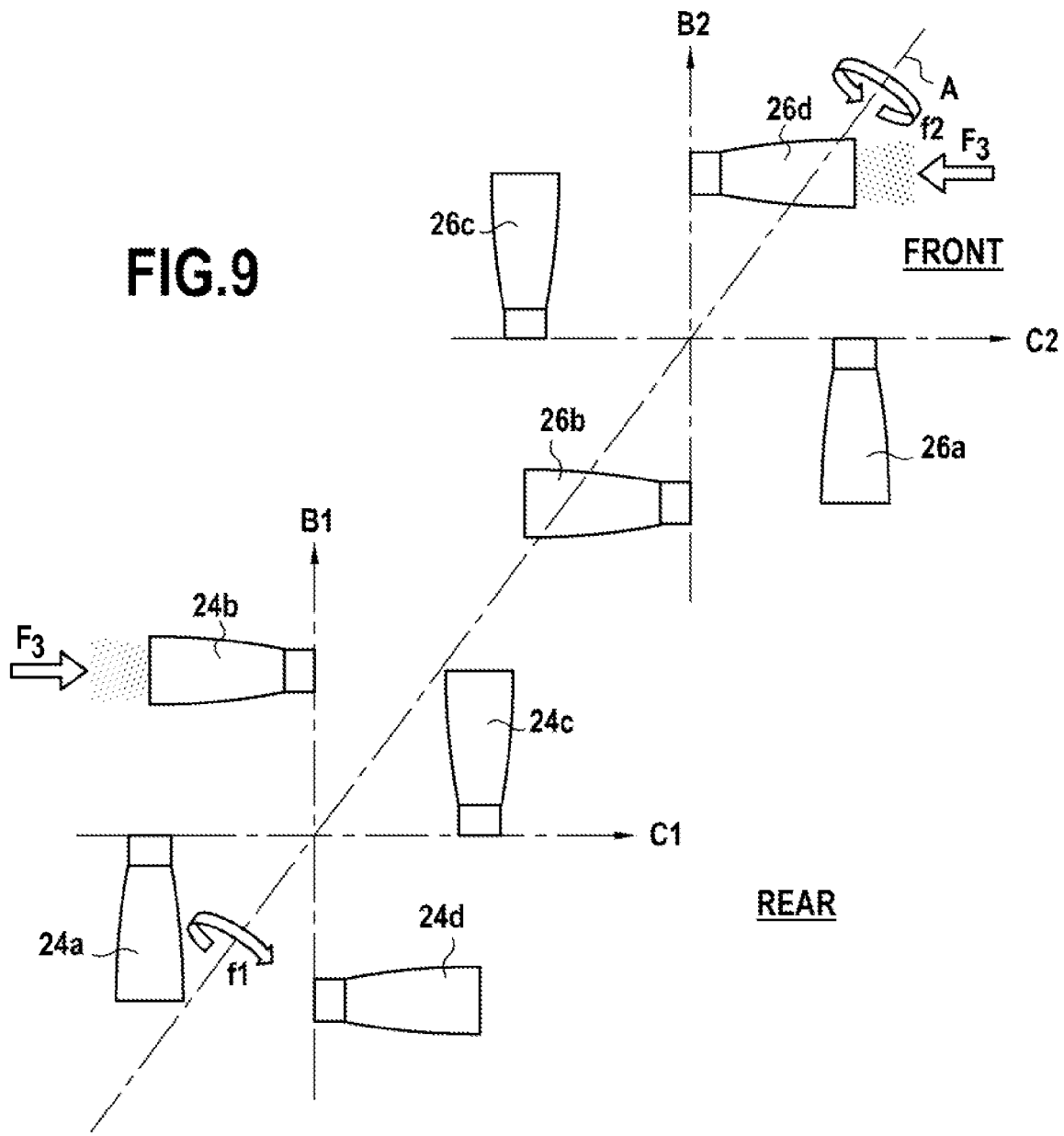

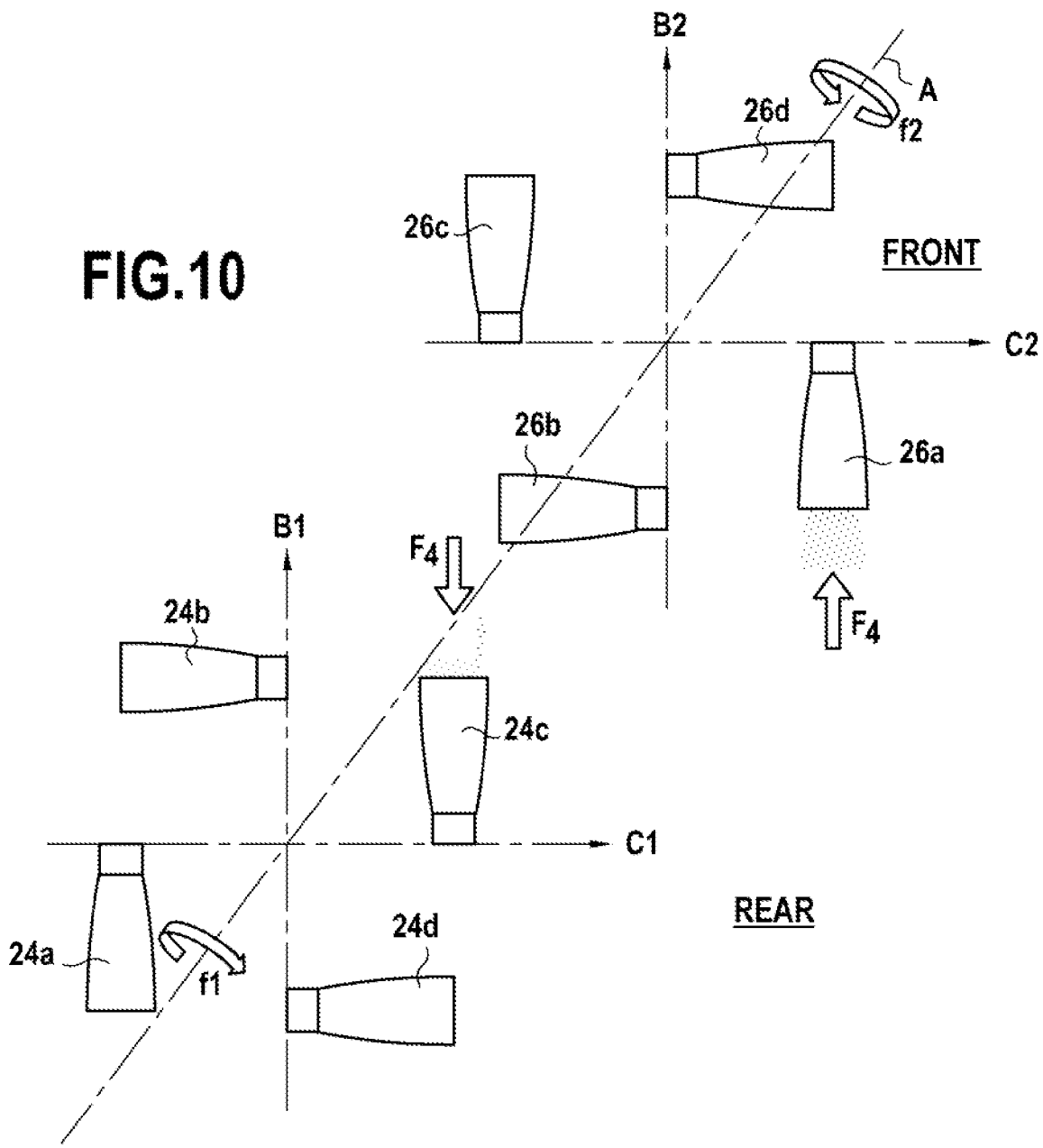

IN-FLIGHT ATTITUDE CONTROL AND DIRECT THRUST FLIGHT CONTROL SYSTEM OF A VEHICLE AND CRAFT COMPRISING SUCH A SYSTEM

BACKGROUND OF THE INVENTION

The invention relates to a system for providing a vehicle with in-flight attitude control and side-force steering, also known as a divert and attitude control system (DACS).

The invention is particularly applicable to the high or terminal portions of interceptor missiles used for defense against ballistic missiles, and specifically to maintaining a desired trajectory and attitude at the end of a mission. Nevertheless, the invention can be used for other types of air or space vehicle, e.g. for anti-aircraft defense missiles, air-to-air missiles, atmospheric reentry vehicles, or indeed space exploration modules.

A known DACS for a vehicle constituting the terminal portion of an interceptor missile is shown very diagrammatically in FIG. 1. This DACS 1 comprises a thruster body 2 having two propellant blocks 3 ideally arranged on either side of a metal ring 4 carrying side-force steering or trajectory divert valves 5. Four divert valves 5 are provided, and they are arranged regularly around the axis A of the vehicle 1, substantially level with its center of gravity, so as to generate side thrusts perpendicularly to the axis A without major disturbance to the attitude of the vehicle 1. Six other valves 6 for attitude correction are provided at the rear end of the thruster body 2. These attitude control system (ACS) valves 6 comprise a first pair of valves having two valves oriented in a first direction substantially perpendicular to the axis A, a second pair of valves having two valves oriented in a second direction opposite to the first direction, and two other valves oriented in mutually opposite directions that are substantially perpendicular to the axis A and to the first and second directions. A control device (not shown) comprising control electronics and actuators is provided for selectively controlling the opening of one or two valves 5 when a trajectory correction is needed, and for selectively opening one or more valves 6 when an attitude correction is required (a correction in yaw, roll, and/or pitching). The propellant blocks 3 are used simultaneously for feeding the valves 5 and 6.

Such a configuration for a DACS requires a total of ten valves arranged in two groups having distinct functions, the trajectory divert valves and the attitude control valves generally being of different types, with this being penalizing in terms of weight, size, and cost. In addition, the location of the divert valves within the thruster body and between two blocks of propellant is not optimal in terms of pyrotechnic safety, in particular during assembly operations, and it makes control and maintenance of the propulsive system more complex. Furthermore, the location of the divert valves limits operation duration because they are exposed to very high temperatures, or else puts a limit on gas temperature, and in either case performance suffers.

Other DACSs are described in document GB 2 251 834 A.

In one embodiment, two sets of four valves are arranged on opposite sides of the center of gravity of the vehicle. In each of the sets, two valves exert thrust in a first direction and two other valves exert thrust in a second direction opposite to the first, the thrust axes of the valves being situated at a distance from the longitudinal axis of the vehicle, on either side thereof.

Such a system makes it possible at any given instant to divert the trajectory solely along the thrust axes of the valves. In order to divert the trajectory in some other direction, it is necessary to begin by orienting the missile about its own axis by using its ability to control its attitude in roll. This leads to a loss in response time and in maneuverability, and also to significant excess consumption. The same applies in particular for performing a yaw correction.

In another embodiment, two sets of four valves are likewise arranged on opposite sides of the center of gravity of the vehicle. In each set, two valves exert thrust in opposite directions in alignment on a common first axis and two other valves exert thrust in opposite directions in alignment on a common second axis, the first and second axes being mutually perpendicular and being perpendicular to the axis of the vehicle, and intersecting on the axis of the vehicle. Roll control is therefore not possible.

OBJECT AND SUMMARY OF THE INVENTION

An object of the invention is to remedy the above-mentioned drawbacks, and in one of its aspects, the invention proposes for this purpose a system for providing a vehicle with in-flight attitude control and side-force steering, the system comprising a thruster body and a plurality of valves capable of generating side thrusts by being put into communication with the thruster body by means of a control device arranged to act individually on each valve, in which system:

the valves are distributed in first and second sets of valves, the two sets being disposed at a distance apart from each other respectively towards the front and towards the rear of the thruster body in a manner that is substantially symmetrical about the center of gravity of the vehicle, which center of gravity is situated on a longitudinal axis of the vehicle;

each set of valves is constituted by four valves and comprises a first pair of valves arranged to generate side thrust in opposite directions along thrust axes that are not aligned and are parallel to a first axis, and a second pair of valves that are arranged to generate side thrust in opposite thrust directions along thrust axes that are not aligned and are parallel to a second axis; and the first and second axes are distinct and perpendicular to the longitudinal axis of the vehicle.

Preferably, the first and second axes in each set of valves are mutually perpendicular.

Preferably, the valves are all identical.

Also preferably, the thrust axes of all of the valves are situated at the same distance from the longitudinal axis of the vehicle.

Also preferably, the valves are situated outside the thruster body.

The thruster body contains a gas generator comprising solid propellant or liquid propellants or hybrid propellants. With a solid propellant, the thruster body advantageously contains a single block of solid propellant, preferably placed at the center of gravity of the vehicle in order to maintain centering of the system throughout combustion.

Compared with the above-described DACSs, the system of the invention with two sets of four valves arranged as specified is advantageous in that with a small number of valves it enables all desired trajectory and attitude corrections to be performed instantaneously or almost instantaneously, and thus with a response time that is very short.

Various corrections, in particular trajectory diversion, are obtained by selectively causing one or more valves in each set of valves to open simultaneously, and that also gives rise to other advantages.

Firstly, by sharing the required thrusts over the two sets of valves, it becomes possible for a given desired resultant thrust to reduce the individual thrust requested of each valve. For a given level of performance in terms of corrective thrust, the weight and the dimensions of the valves, and the power required for activating them, can be smaller, and/or the pressure in the thruster body can be decreased, thereby in either case improving steering accuracy.

Furthermore, sharing valve resources for the functions of side-force steering and of attitude control advantageously enables identical valves to be used, thereby contributing to simplifying the definition and the provision of the system and thus reducing development and fabrication costs.

A preferred configuration for the valves at the outside of the thruster body also contributes to simplifying the definition and the provision of the system, while also presenting good safety from a pyrotechnic point of view.

In addition, when generating gas by means of a solid propellant, using a single block of propellant also goes towards simplification and towards a reduction in costs.

In another of its aspects, the invention also provides a space or air vehicle including a system as defined above, in particular a missile having a terminal portion fitted with such a system.

BRIEF DESCRIPTION OF THE DRAWINGS

The invention can be better understood on reading the following description given by way of non-limiting indication and with reference to the accompanying drawings, in which:

FIG. 6 shows a side thrust vector corresponding to a desired trajectory diversion;

FIG. 7 shows how the FIG. 6 thrust vector can be produced by combining individual thrusts generated by valves of the two sets of valves of the DACS fitted to the missile terminal portion of FIGS. 3, 4 and 5;

FIG. 9 shows how a yaw correction can be produced by combining individual thrusts generated by valves of the two sets of valves of the DACS fitted to the missile terminal portion of FIGS. 3, 4 and 5; and FIG. 10 shows how a pitching correction can be produced by combining individual thrusts generated by valves of the two sets of valves of the DACS fitted to the missile terminal portion of FIGS. 3, 4 and 5.

DETAILED DESCRIPTION OF EMBODIMENTS

Figure 1:
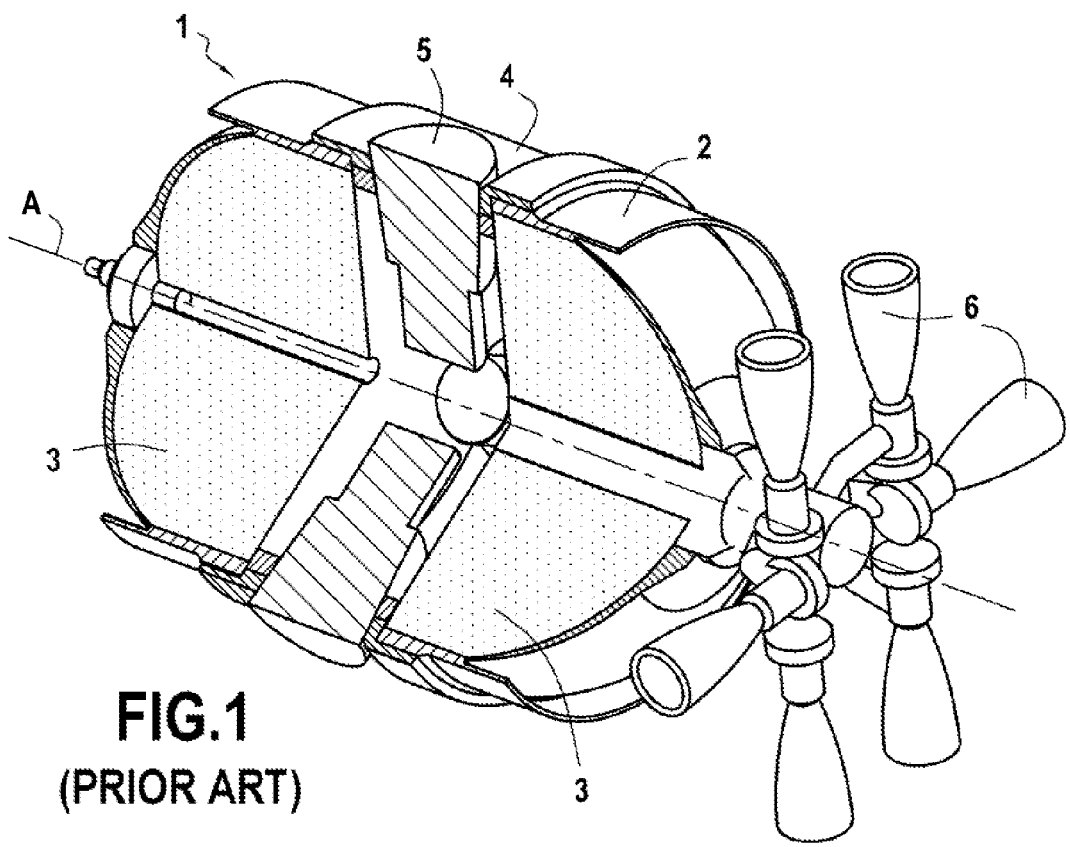
FIG. 1, described above, is a very diagrammatic view of a terminal portion of an interceptor missile fitted with a prior art DACS.
Figure 2:
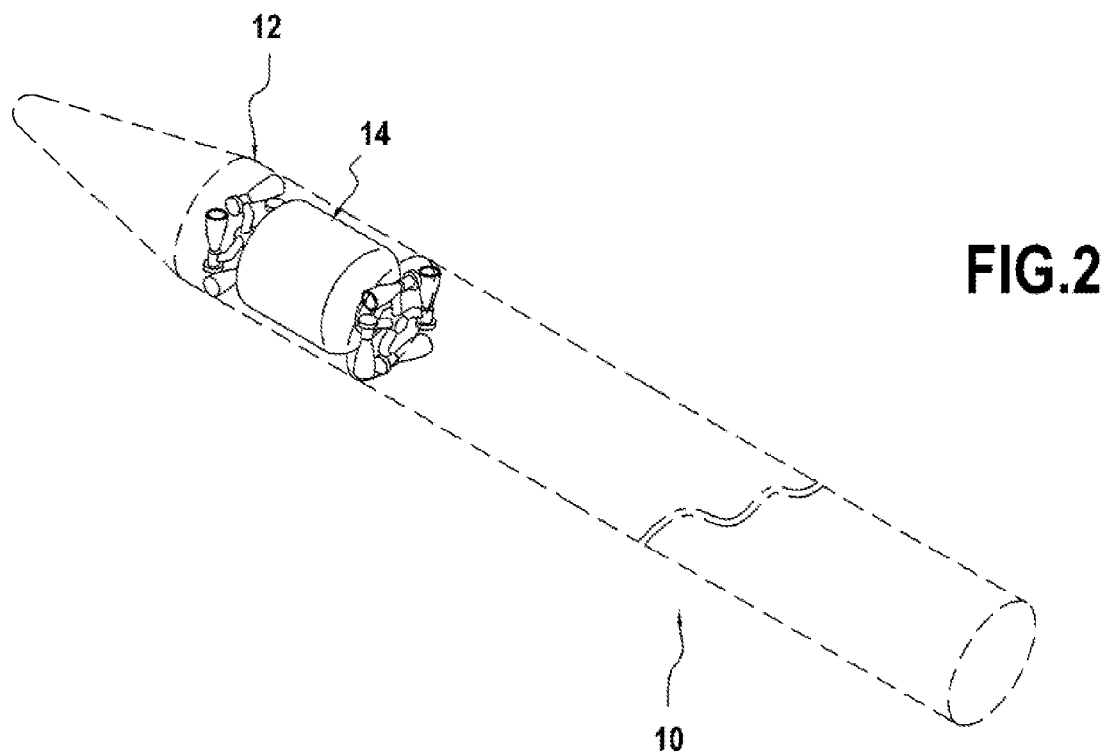
FIG. 2 is a highly diagrammatic view of an interceptor missile having a terminal portion fitted with a DACS in an embodiment of the invention.

FIG. 2 is a highly diagrammatic view of an interceptor missile 10 for providing defense against ballistic missiles, having a top or terminal portion 12 fitted with a DACS 14 for steering the terminal portion 12, possibly by trajectory diversion and possibly by attitude correction at the end of its mission after being separated from the remainder of the missile.

Figure 3:
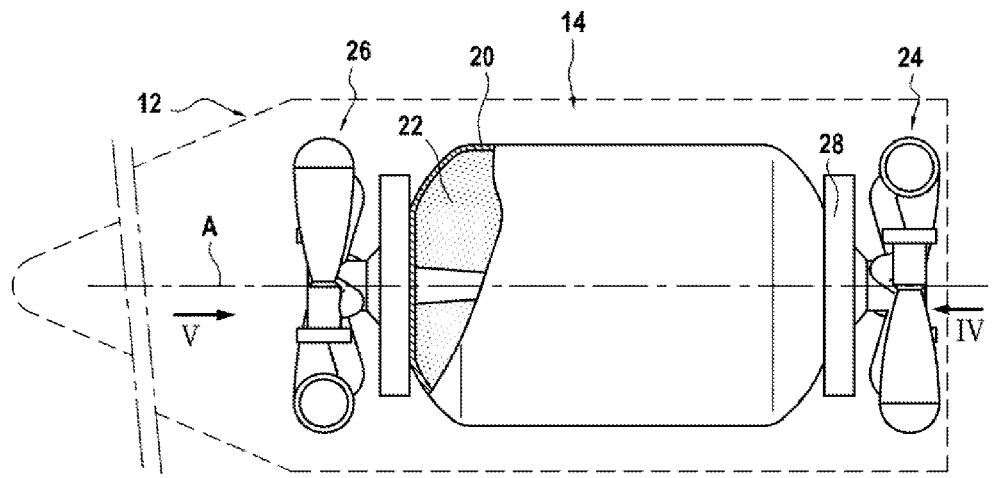
FIGS. 3, 4, and 5 are views on a larger scale showing the terminal portion of the FIG. 2 missile, respectively in side view, in rear view, and in front view.
Figures 4, 5:
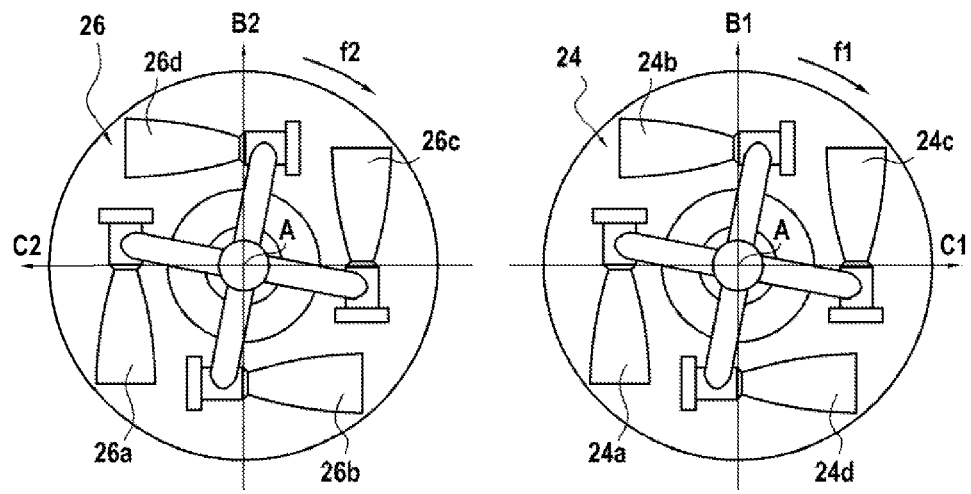

The DACS 14 (FIGS. 3, 4, and 5) comprises a thruster body 20 containing a block of solid propellant 22, a first set 24 of valves situated at the rear of the thruster body 20, a second set 26 of valves situated at the front of the thruster body 20, and an electronic control device 28 for selectively causing the valves of the first and second sets of valves to open and close by means of actuators (not shown). The terms "front" and "rear" are used relative to the travel direction of the terminal portion 12.

The first set 24 of valves is advantageously constituted by four valves 24a, 24b, 24c, and 24d, and the second set 26 of valves is likewise advantageously constituted by four valves 26a, 26b, 26c, and 26d.

In the open position, each valve is in communication with the thruster body and generates side thrust by ejecting gas produced by the combustion of the propellant. The term "side" thrust is used herein to mean thrust along a thrust axis that is perpendicular or substantially perpendicular to the axis A of the terminal portion 12. An angle of a few degrees between the thrust that is produced and a plane perpendicular to the axis A may be acceptable providing no resultant thrust of significant amplitude is generated in one direction or the other along the axis A, under drive from the combined thrust of the various open valves.

In the first set 24, the valves 24a and 24c are oriented to produce side thrust in mutually opposite directions parallel to an axis B1, whereas the valves 24b and 24d are oriented to produce side thrust in mutually opposite directions parallel to an axis C1. The axes B1 and C1 in this example are orthogonal or substantially orthogonal and they intersect each other on the axis A. It should be observed that the thrust axes of the valves 24a and 24c are parallel but not in alignment, since they are situated on opposite sides of the axis B1. Likewise, the thrust axes of the valves 24b and 24d are parallel but not in alignment, since they are preferably situated on either side of the axis C1. Thus, the thrusts from the valves in the set 24 give rise to rotational torque in a direction f1 about the axis A.

In the second set 26, the valves 26a and 26c are oriented to produce side thrusts in mutually opposite directions parallel to an axis B2, while the valves 26b and 26d are oriented to produce side thrusts in mutually opposite directions parallel to an axis C2. In this example, the axes B2 and C2 are orthogonal or substantially orthogonal and they intersect on the axis A. It should be observed that the thrust axes of the valves 26a and 26c are parallel but not in alignment, preferably being situated on either side of the axis B2. Likewise, the thrust axes of the valves 26b and 26d are parallel but not in alignment, preferably being situated on either side of the axis C2. The valves of the set 26 are arranged so that their thrusts give rise to rotational torque about the axis A in a direction f2 opposite to the direction f1.

Preferably, but not necessarily, the axes B1 and B2 are mutually parallel, as are the axes C1 and C2.

In the example shown, the set 24 of valves is mounted outside the thruster body 20 towards its rear end. The set 26 of valves is mounted outside the thruster body 20 towards its front end, with the sets 24 and 26 of valves being arranged symmetrically about the center of gravity of the terminal portion assembly 12, the center of gravity being situated on the axis A. The payload and the various other pieces of equipment of the terminal portion 12 are preferably arranged so that the position of the center of gravity remains substantially unchanged as the propellant is consumed progressively.

The two sets of valves 24 and 26 are situated at a distance from each other along the axis A so as to be capable of generating side thrusts with appropriate torques, in particular for correcting pitching or yaw. In practice, the set of valves 26 is mounted at the front end of the thruster body 20 or close to said front end, e.g. in a position that is forwardly offset. The lever arm (i.e. the distance between the point at which thrust is applied and the center of gravity) is thus maximized for available overall space.

Advantageously, the valves 24a, 24b, 24c, 24d, 26a, 26b, 26c, and 26d are all identical, thereby simplifying the definition and the provision of the DACS. Such simplification is also the result of mounting the valves outside the thruster body 20, this configuration also providing good pyrotechnic safety. Also advantageously, but not necessarily, the thrust axes of all of the valves are situated at the same distance from the axis A.

In known manner, the control device 28 acts on actuators (not shown) respectively associated with the various valves of the sets 24 and 26 to control the degree to which they are opened, i.e. the gas-passing sections in pipes connecting the valves to the thruster body, the valves thus being variable-opening valves that can be controlled over the range completely shut to fully open.

The propellant block 22 is ignited after the terminal portion 12 has separated from the remainder of the missile.

So long as no trajectory or attitude correction is required, all of the valves in the sets 24 and 26, or some of them in a symmetrical arrangement, are kept open to the same extent in order to allow combustion gas to escape but without generating any resultant thrust. In a variant, after a correction stage, the propellant may be extinguished by simultaneously opening all of the valves fully, with the propellant being re-ignited as soon as a new correction is required.

When a correction is required, the control device 30 causes some of the valves to close, while leaving open only those valves that are useful for generating individual thrusts that, in combination, will provide the required correction, it being possible to adjust the degree of opening of the valves that are left open.

In the above detailed description, the thruster body forming a gas generator contains a single block of solid propellant. In a variant, a plurality of separate propellant blocks could be provided suitable for being ignited during respective different periods of the flight of the terminal portion 12, each block feeding gas to all of the valves when it is ignited.

It is also possible to use a gas generator based on liquid propellants or on hybrid propellants.

Example configurations for opening the valves in order to perform various types of correction are described below. It should be observed that in most situations, at least one of the valves in each of the sets 24 and 26 of valves is open, with the valve resource being shared in order to perform the various types of correction.

EXAMPLE 1

Trajectory Diversion

A trajectory correction may be required for example in which the trajectory is diverted by applying side thrust F as shown in FIG. 6, this thrust being resolved into a component $F_1$ along an axis B parallel the axes B1 and B2, and a component $F_2$ along an axis C parallel to the axes C1 and C2.

FIG. 7 is a very diagrammatic view showing the valves that remain open under the control of the control device 28, the other valves being closed. The component $F_1$ is produced by the valves 24a and 26a with their openings being adjusted so that each of them generates a thrust $F_1/2$. The component $F_2$ is produced by the valves 24b and 26b with their openings being adjusted so that each of them generates a thrust $F_2/2$. The other valves of the sets 24 and 26 are closed.

The valves 24a and 26a are situated on two opposite sides of the axis A, such that the torques produced by the thrusts from those two valves cancel. The same applies for the valves 24b and 26b. Thus, trajectory diversion does not lead to any disturbance of attitude.

EXAMPLE 2

Correcting Roll

A roll correction is produced in this example by simultaneously opening two valves that generate thrusts in opposite directions in one of the sets of valves, depending on the direction of the rotation to be corrected.

Figure 8:
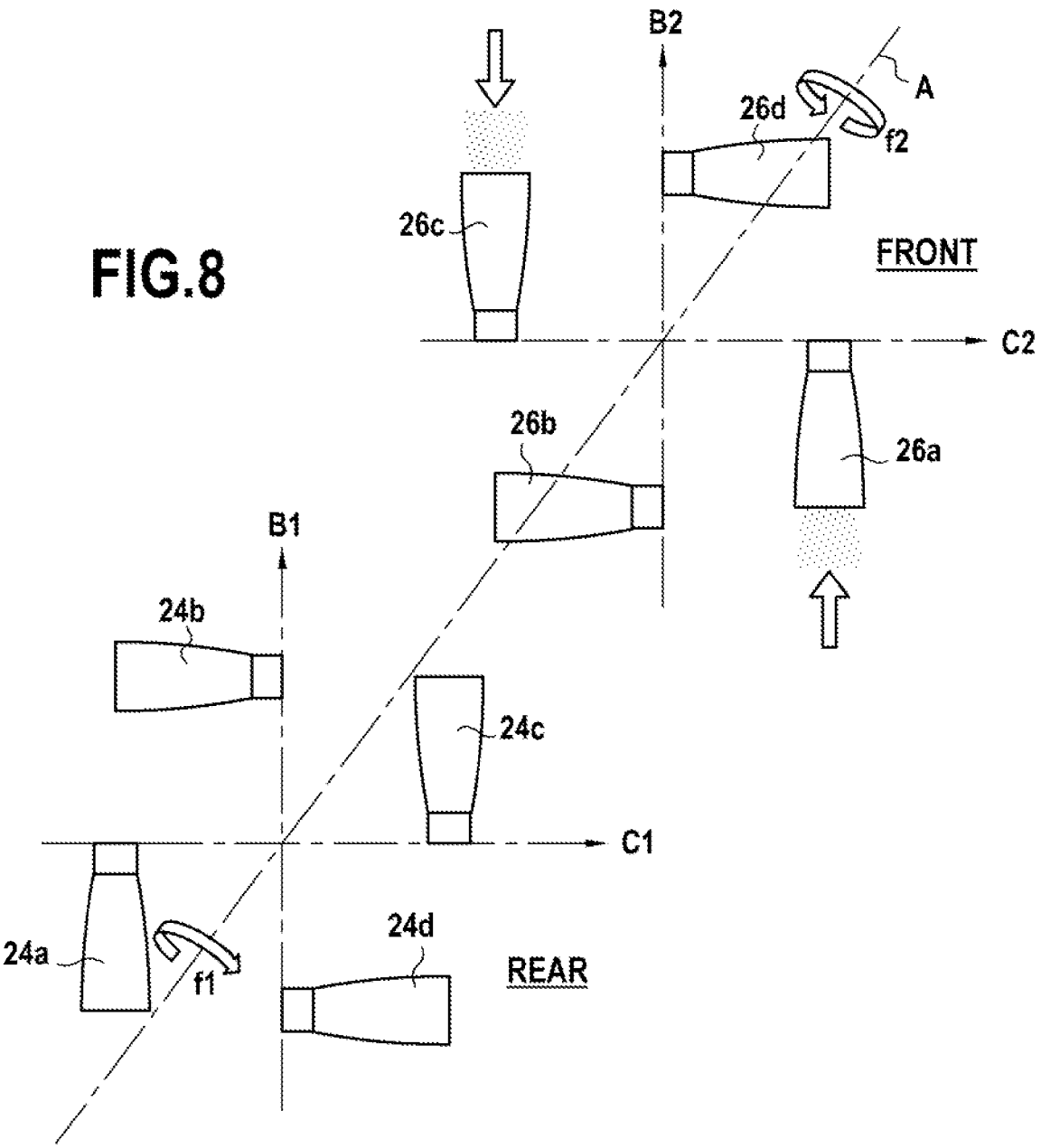
FIG. 8 shows how a roll correction can be produced by combining individual thrusts generated by valves of the two sets of valves of the DACS fitted to the missile terminal portion of FIGS. 3, 4 and 5.

FIG. 8 shows only the valves 26a and 26c in the set 26 at the front of the thruster body being opened in order to perform a roll correction that is applied in the direction of rotation $f_2$. The valves of the set 24 at the front of the thruster may be closed or they may be kept at a common degree of opening that is small enough to avoid canceling the effect of the valves 26a and 26c. The valves 26a and 26c generate thrust of the same amplitude in order to avoid inducing any resultant side thrust.

In a variant, all four valves of the set 26 could be open.

Naturally, a roll correction for application in the direction of rotation $f_1$ could be produced by thrust from two or four valves of the set 24.

EXAMPLE 3

Yaw Correction

A yaw movement is used herein to mean oscillation about an axis parallel to the axes B1 and B2.

Yaw correction must be obtained by generating side thrust $F_3$ perpendicular to the axis B1 and B2 using one valve in each of the sets 24 and 26.

In the example of FIG. 9, the yaw correction is obtained by opening the valve 26d that exerts a thrust $F_3$, and the valve 24b that likewise exerts a thrust $F_3$, the other valves being closed. In principle no roll is generated, but if necessary, compensation for any roll may be provided as described above.

EXAMPLE 4

Correcting Pitching

A pitching movement is defined herein as an oscillation about an axis parallel to the axes C1 and C2.

A pitching correction can thus be obtained by generating side thrust perpendicular to the axes C1 and C2 by one valve in each of the sets 24 and 26.

In the example of FIG. 10, the pitching correction is obtained by opening the valve 26a exerting a thrust $F_4$ and the valve 24c likewise exerting a thrust $F_4$, the other valves being closed. In principle no roll is generated, but, if necessary, compensation for any roll can be applied as described above.

In the above examples, various correction configurations are described, using two pairs of valves in each set 24 and 26 acting along directions parallel to orthogonal axes B1 and C1 or B2 and C2, and having thrust axes all situated at the same distance from the axis A. Naturally, the same corrections could be performed in the event of the axes B1 and C1 or B2 and C2 being mutually different but not orthogonal, and/or in the event of the thrust axes of the valves not all being at the same distance from the axis A, with this being possibly by controlling the valves appropriately in order to produce the desired resultant side thrust.

Under all circumstances, a response to a need for trajectory diversion or to a need for roll, yaw, or pitching attitude control can be obtained immediately.

The invention claimed is:

1. A system for providing a vehicle with in-flight attitude control and side force steering, the system comprising:
   a thruster body and a plurality of valves capable of generating side thrusts by being put into communication with the thruster body by means of a control device arranged to act individually on each valve;
   wherein the valves are distributed in first and second sets of valves, the two sets being disposed at a distance apart from each other respectively towards the front and towards the rear of the thruster body in a manner that is substantially symmetrical about the center of gravity of the vehicle, which center of gravity is situated on a longitudinal axis of the vehicle;
   wherein each set of valves is constituted by four valves and comprises a first pair of valves arranged to generate side thrust in opposite directions along thrust axes that are not aligned and are parallel to a first axis, and a second pair of valves that are arranged to generate side thrust in opposite thrust directions along thrust axes that are not aligned and are parallel to a second axis;
   wherein the first and second axes are distinct and perpendicular to the longitudinal axis of the vehicle; and
   wherein the first and second axes in each set of valves are mutually perpendicular.

2. A system according to claim 1, wherein the valves are all identical.

3. A system according to claim 1, wherein the thrust axes of all of the valves are situated at the same distance from the longitudinal axis of the vehicle.

4. A system according to claim 1, wherein the valves are situated outside the thruster body.

5. A system according to claim 1, wherein the thruster body contains a gas generator comprising solid propellant.

6. A system according to claim 5, wherein the thruster body contains a single block of propellant.

7. A system according to claim 1, wherein the thruster body contains a gas generator using liquid propellants or hybrid propellants.

8. A space or air vehicle including a system according to claim 1.

9. A missile having a terminal portion fitted with a system according to claim 1.

* * * * *